(12) United States Patent
Barua et al.

(10) Patent No.: US 8,332,285 B1
(45) Date of Patent: Dec. 11, 2012

(54) INVENTORY LOSS PREDICTION

(75) Inventors: Abhik Barua, Overland Park, KS (US); Deandra T. Cassone, Overland Park, KS (US); John R. Reboulet, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 241 days.

(21) Appl. No.: 12/854,338

(22) Filed: Aug. 11, 2010

(51) Int. Cl.
*G06Q 10/00* (2012.01)
(52) U.S. Cl. .......................................................... 705/28
(58) Field of Classification Search ........................ None
See application file for complete search history.

(56) References Cited

U.S. PATENT DOCUMENTS 8,249,956 B1    8/2012  Barua et al.
2007/0239568 A1*  10/2007  Conley et al. .................... 705/28

OTHER PUBLICATIONS

Barua, Abhik, et al., "Inventory Variance Detection Modeling", U.S. Appl. No. 12/729,601, filed Mar. 23, 2010.
Pre-Interview Communication dated Oct. 26, 2011, U.S. Appl. No. 12/729,601, filed Mar. 23, 2010.
Camdereli, Zeynep Almula, "Operational Inefficiencies in Supply Chains: Performance, Coordination and the Role of Information Systems", ProQuest Information and Learning Company, Ann Arbor, MI 2007.
Dickens, William T., et al., "Employee Crime and the Monitoring Puzzle", Journal of Labor Economics, vol. 7, No. 3, pp. 331-347, The University of Chicago Press, Jul. 1989.
Howell, Sidney, et al., "Pattern Analysis of Data for Control System Diagnostics", European Management Journal, vol. 15, No. 2, pp. 167-173, Elsevier Science Ltd., Apr. 1997.
Sackett, Paul R., "Integrity Testing for Personnel Selection", Current Directions in Psychological Science, vol. 3, No. 3, pp. 73-76, Sage Publications, Inc., Jun. 1994.
Notice of Allowance dated Apr. 20, 2012, U.S. Appl. No. 12/729,601 filed on Mar. 23, 2010.

* cited by examiner

*Primary Examiner* — Matthew Gart
*Assistant Examiner* — Michael Maicher

(57) ABSTRACT

A system for inventory loss prediction is provided. The system comprises a processor, a memory, and an application stored in the memory that, when executed by the processor, receives a report associating electronic serial numbers of devices with a plurality of instances of inventory loss. The system also creates a list of device characteristics associated with the devices, creates a list of store characteristics associated with retail stores to which the devices were shipped, and determines a first statistical correlation of a device characteristic to inventory loss. The system also determines a second statistical correlation a store characteristic to inventory loss and predicts, based on the first statistical correlation and the second statistical correlation, a probability of inventory loss.

12 Claims, 5 Drawing Sheets

US 8,332,285 B1

INVENTORY LOSS PREDICTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Inventory loss is the loss of products between point of manufacture or purchase from supplier and point of sale. Inventory loss can adversely impact a company's profit margins and may result in increased costs to the company's customers. Inventory loss may be due to product damage, loss, misplacement, and other causes. Inventory loss also may be due to damage in transit, administrative problems such as shipping errors, warehouse discrepancies, and misplaced goods. Problems with information systems may contribute to inventory loss. Inventory loss also may be attributable to fraud perpetrated by manufacturers, shippers, and retailers of goods. When dealing with some perishable goods, such as produce, natural spoilage may become a source of loss. Other perishable goods, such as time-dated material comprising newspapers and magazines, may be subject to inventory loss due to shipping and forwarding delays. Inventory loss not related to shipping, receiving, and warehousing may occur at the retail point of sale. A point of sale system may monitor employee actions, particularly in the areas of providing discounts, markdowns, and refunds. Management oversight and auditing of these actions may reduce inventory loss.

SUMMARY

In an embodiment, a system for inventory loss prediction is provided. The system comprises a processor, a memory, and an application stored in the memory that, when executed by the processor, receives a report associating electronic serial numbers of devices with a plurality of instances of inventory loss. The system also creates a list of device characteristics associated with the devices, creates a list of store characteristics associated with retail stores to which the devices were shipped, and determines a first statistical correlation of a device characteristic to inventory loss. The system also determines a second statistical correlation of a store characteristic to inventory loss and predicts, based on the first statistical correlation and the second statistical correlation, a probability of inventory loss.

In an embodiment, a processor-implemented method of inventory loss prediction is provided. The method comprises a prediction server determining that a first correlation of a combination of a first device characteristic with a first store characteristic with a first plurality of instances of inventory loss is of a statistical significance greater than a first defined threshold. The method also comprises the prediction server determining that a second correlation of a combination of a second device characteristic with a second store characteristic with a second plurality of instances of inventory loss is of a statistical significance less than the first defined threshold and greater than a second defined threshold. The method also comprises the prediction server determining that a third correlation of a combination of a third device characteristic and a third store characteristic with a third plurality of instances of inventory loss is of a statistical significance less than the second defined threshold. The method also comprises the prediction server assigning a first loss risk factor to shipments of devices with the first device characteristic shipped to retail stores with the first store characteristic. The method also comprises the prediction server assigning a second loss risk factor to shipments of devices with the second device characteristic shipped to retail stores with the second store characteristic. The method also comprises the prediction server assigning a third loss risk factor to shipments of devices with the third device characteristic shipped to retail stores with the third store characteristic. The method also comprises the prediction server building a predictive algorithm combining the first loss risk factor, the second loss risk factor, and the third loss risk factor wherein electronic serial numbers of devices in outgoing shipments and the destination retail stores for the devices are entered into the predictive algorithm and subjected by the predictive algorithm to decision criteria regarding the device characteristics of the devices and the store characteristics of the destination retail stores, wherein a composite loss risk factor is determined for each outgoing shipment. The method also comprises the prediction server receiving information about a first shipment of devices, the information comprising the electronic serial numbers of the devices and the destination retail stores of the devices. The method also comprises the prediction server submitting the information to the predictive algorithm for processing and the prediction server determining a composite loss risk factor for the first shipment.

A processor-implemented method of inventory loss prediction is provided. The method comprises a prediction server associating a predetermined high level of first security measures with a first composite loss risk factor, associating a predetermined medium level of second security measures with a second composite loss risk factor, and associating a predetermined low level of third security measures with a third composite loss risk factor wherein composite loss risk factors are determined by a predictive algorithm associating a plurality of device characteristics and store characteristics to inventory loss. The method also comprises the prediction server associating, based on electronic serial numbers of devices and destination retail store information, a first shipment with the first composite loss risk factor, a second shipment with the second composite loss risk factor, and a third shipment with the third composite loss risk factor. The method also comprises the prediction server applying the predetermined high level of first security measures to the first shipment wherein the first security measures comprise at least conducting full physical inventory counts of the shipped devices upon the first shipment departing a distribution warehouse, upon the first shipment arriving at the retail store associated with the first shipment, and after the devices in the first shipment have been stored at the retail store for a predetermined period of time. The method also comprises the prediction server applying the predetermined medium level of second security measures to the second shipment wherein the second security measures comprise at least conducting selective physical examinations of electronic serial numbers of devices stored in inventory by the retail store associated with the second shipment and auditing receiving and sales documentation provided by the retail store to supplement the physical examinations. The method also comprises the prediction server applying the predetermined low level of third security measures to the third shipment wherein the third security measures comprise conducting training of personnel employed by the retail store associated with the third shipment about safeguarding inventory of devices and accessory products. These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
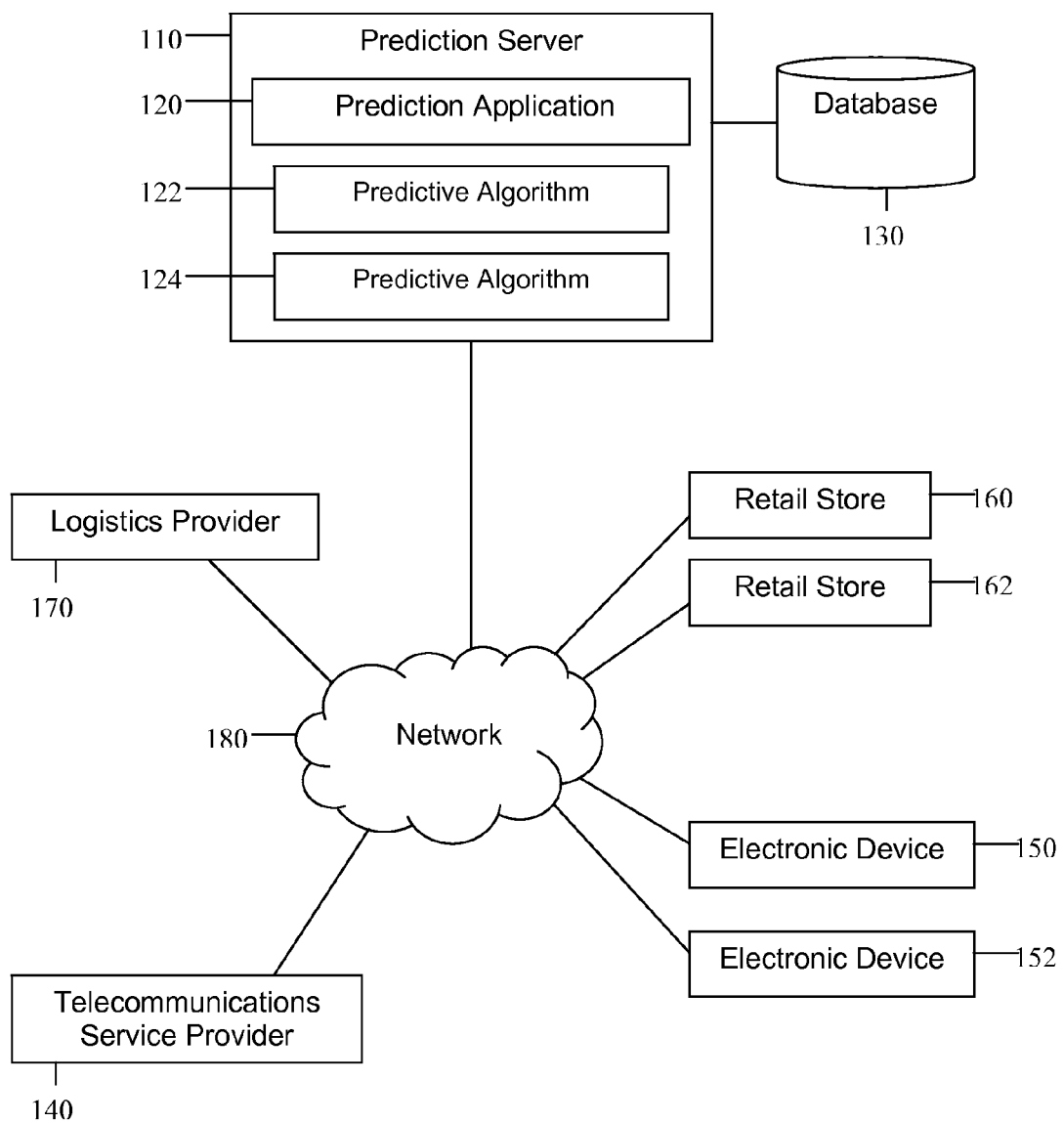
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a system of inventory loss prediction that determines statistical relationships between product and retail store characteristics and instances of product loss. The system teaches the development of predictive models or algorithms that may promote the detection of vulnerabilities in a product distribution network and may suggest corrective action. Product loss and damage after products have been shipped from a distribution warehouse may occur during shipment or after receipt by retail stores. Through statistical analysis, instances of inventory loss may be correlated with selected characteristics of products, retail stores, and related processes, providing insight into the causes of inventory loss. The present disclosure teaches that high correlations of inventory loss with specifically identified individual product characteristics, store characteristics, related processes, or combinations thereof may suggest solutions targeted directly to the identified product, store, and/or related process. Low correlations may indicate that inventory loss is not attributable to the characteristics or related processes under examination and may suggest looking to other product or store characteristics for statistically significant relationships.

A telecommunications service provider, manufacturer, distributor, or other vendor of electronic devices, for example mobile telephones, may experience inventory loss and damage after the devices have been shipped from a warehouse location. The loss may occur while the electronic devices are in the control of a logistics provider, the destination retail store, or other party after the electronic devices have left the warehouse. The losses may appear to be random and unrelated to each other and therefore may be difficult to track, analyze, and address. Significant correlations between inventory losses and products, retail stores, some of their characteristics, and processes related to distribution, shipping, and retail store receiving and handling may exist but may be difficult to detect. Subtle or overlooked aspects of the telecommunications service provider's distribution procedures, security policies, or management practices may have security vulnerabilities that result in electronic device or accessory losses. What may appear to be unrelated or benign characteristics of a certain model of electronic device and characteristics of one or more retailers when concurrently in effect may comprise a security vulnerability that may not be overtly visible even to an experienced manager. A model of an electronic device receiving heavy promotion and advertising or shipped in a certain manner may be vulnerable to loss. Minor or secondary features of an electronic device may be perceived as distinctive and valuable by the buying public and may lead to inventory loss of the model of electronic device embodying the feature. A subtle difference in retail store floor layout or in inventory receiving procedure may be found to be closely related to variances in inventory loss between two types of retail stores.

The present disclosure teaches a system and methods of discovering correlations between at least one electronic device characteristic, store characteristic, and/or related process and instances of inventory loss. The system assembles a listing of characteristics of at least one electronic device that may have been subject to loss. The characteristics include hardware and software attributes of the electronic device as well as marketing, promotion, and even broader economic attributes of the device that may be of potential value and may be quantifiable or otherwise measurable. The system also assembles a listing of characteristics of at least one retail store or sales or distribution region, area, or district. The characteristics may comprise a physical characteristic, such as a specific floor layout of a group of retail stores, or may comprise a less tangible characteristic such as a commonality of a receiving or storage practice across a group of retail stores, for example within several contiguous sales districts, suffering unusual inventory losses. The system captures information about instances of inventory losses. The system may select one or more of the electronic device characteristics and the store characteristics and attempt to discover a statistical correlation between the one or more characteristics and an identified group of inventory losses. The system may calculate statistical correlations between a plurality of electronic device and store characteristics and inventory losses. Significant correlations may provide clues or indications that the electronic device has a high profile or that there exist security vulnerabilities with the logistics provider and/or the retail store.

By calculating statistical correlations using a plurality of characteristics, the system may discover subtle or unforeseen linkages between devices and/or retail stores and inventory loss. These linkages may point to discrete and specifically addressable problems that may suggest targeted solutions. High correlations involving a few specific product and/or store characteristics may promote a targeted solution that is directed only at the products or stores with the characteristic(s) and may leave other products and/or stores unaffected. Such a targeted solution may be cost effective and not difficult to implement. The system may promote the telecommunications service provider to implement the fewest and least expensive controls and achieve the most efficient desired results in terms of reduced inventory losses. Controls are targeted through the system's analysis that predicts the points in the distribution processes and retail store network of the telecommunications service provider where the controls may have the most impact.

Turning now to FIG. 1, a system 100 for predicting inventory loss is provided. The system 100 comprises a prediction server 110, a prediction application 120, predictive algorithms 122, 124, a database 130, a telecommunications service provider 140, electronic devices 150, 152, retail stores 160, 162, a logistics provider 170, and a network 180.

The prediction server 110 is a computer system. Computer systems are described in detail hereinafter. The prediction application 120 executes on the prediction server 110 and examines individual and combined characteristics of electronic devices 150, 152, retail stores 160, 162, and related processes in relation to inventory loss during shipment and after arrival at the retail stores 160, 162. The prediction application 120 identifies characteristics of electronic devices 150, 152 and retail stores 160, 162 that individually or in various combinations may frequently occur coincident with instances of inventory loss wherein the electronic devices 150, 152 are lost or damaged. The prediction application 120 determines levels of statistical correlation between characteristics of electronic devices 150, 152, characteristics of retail stores 160, 162, related processes, and combinations thereof and instances of inventory loss of electronic devices 150, 152 and accessories. Significant correlation may suggest the need to apply targeted security measures for the electronic devices 150, 152 and/or at the retail stores 160, 162 wherein the characteristics are present. The prediction application 120 may permit the telecommunications service provider 140, a manufacturer, or a distributor of electronic devices 150, 152, for example mobile telephones, to apply selected controls at targeted retail stores 160, 162 for specific types of electronic devices 150, 152 and reduce inventory loss. Electronic devices 150, 152, retail stores 160, 162, characteristics of each, and related processes may be targeted for enhanced or expanded security measures based on the results of statistical analysis. Security measures may be selectively directed to the targeted electronic devices 150, 152 at the targeted retail stores 160, 162. The system 100 teaches the application of controls at the points where they may be needed most and may promote economy in achieving inventory security goals.

The electronic device 150 may embody desirable hardware and software features or characteristics that may cause the electronic device 150 to be more susceptible to inventory loss than other electronic devices 152. The features may make the electronic device 150 more commercially valuable and therefore easier to liquidate if stolen. The electronic device 150 also may be recently released and heavily promoted and advertised by the telecommunications service provider 140, causing the electronic device 150 to be perceived as more desirable. The electronic device 150 may be shipped in quantities that may cause the electronic device 150 to be more vulnerable to loss. Other aspects of the shipping and receiving arrangements for the electronic device 150 may cause the electronic device 150 to be more vulnerable to loss. Some aspects of shipping and receiving may be regarded as device characteristics. Device characteristics as described herein may be physical attributes of the electronic device 150 itself or they may be economic- or feature-driven factors that cause the electronic device 150 to be susceptible to loss. Device characteristics also may be other factors associated with the market positioning and promotion of the electronic device 150 that increase the risk of loss. If the telecommunications service provider 140 positions the electronic device 150 as its feature phone, i.e. its flagship or prominent product for a given marketing or product cycle, this as an undesired side effect, may result in the electronic device 150 being more vulnerable to loss and may drive the need for selectively targeted security measures. Electronic devices 150, 152 may be mobile telephones, media players, and personal digital assistants (PDA).

The retail stores 160, 162 may similarly embody or exhibit characteristics or attributes that may be associated with inventory loss. The retail store 160 may be located in a geographic area associated with property crime. The retail store 160 may be scheduled for closure. Some floor layouts of the retail store 160 may be associated with higher levels of inventory loss than other floor layouts. Sales volume of the retail stores 160, 162 may be found to have a statistical relationship with inventory loss. Each of these store characteristics may be associated with some aspect of inventory loss. As with device characteristics, store characteristics may be directly associated with the physical retail store 160 itself, such as its layout, or some substantive aspect of the retail store 160, such as its location. Store characteristics also may be indirectly associated with the retail store 160, such as the years of tenure that the manager of the retail store 160 has at the present location or with the company. The years of tenure or the amount of training that other store employees have also may be a measurable factor for examination with regard to inventory loss. In addition to characteristics of retail stores 160, 162, the present disclosure also teaches examining characteristics of sales or distribution regions, areas, districts, or other organizational units of the telecommunications service provider 140. The telecommunications service provider 140 may wish to examine statistical relationships between various combinations of electronic devices 150, 152, retail stores 160, 162, and selected characteristics of each with inventory loss in areas of its business beyond retail stores 160, 162, hence the broadened definition herein of retail stores 160, 162. The choices of elements to consider as potential factors in this analysis, for example device characteristics such as distinctive features, and store characteristics, such as manager tenure and floor layout of store, may in and of themselves be novel and nonobvious.

The prediction application 120 uses device characteristics and store characteristics, as well as statistics about historical inventory loss at a plurality of retail stores 160, 162, to configure at least one predictive algorithm 122. The predictive algorithm 122 may be structured by the prediction application 120 to fit a specific set of circumstances about a shipment of electronic devices 150, 152, their destination retail stores 160, 162, and targeted characteristics of each. The predictive algorithm 122 may consider a plurality of individual or combined device and store characteristics, related processes, and combinations thereof in correlation calculations with inventory losses and may apply different weights to correlation calculations to calculate a composite loss risk factor. The prediction application 120 may feed data to the predictive algorithm 122 that may predict inventory loss at some retail stores 160, 162 for some electronic devices 150, 152. The prediction application 120, in configuring the predictive algorithm 122, may use predefined thresholds for coefficients in determining weightings to apply. The telecommunications service provider 140 shipping electronic devices 150, 152 to retail stores 160, 162 may enter the electronic serial numbers of the electronic devices 150, 152 and information about their destination retail stores 160, 162 into the predictive algorithm 122. The predictive algorithm 122 may read the electronic serial numbers and determine device characteristics associated with the electronic devices 150, 152 involved in the shipment.

The prediction application 120 also provides the predictive algorithms 122, 124 with a listing of store characteristics associated with the retail stores 160, 162 to which the electronic devices 150, 152 in the shipment will be shipped. The prediction application 120 in configuring the predictive algorithms 122, 124 may select individual device characteristics and store characteristics or combinations thereof for the electronic devices 150, 152 and the retail store(s) 160, 162, respectively, involved in the shipment. The predictive algorithm 122 also draws upon historical inventory loss information about both the electronic devices 150, 152 and the retail store(s) 160, 162 involved in the shipment from the database 130. The historical inventory loss information may be detailed and may be broken down by electronic devices 150, 152 and their various device characteristics. The historical inventory loss information also may be broken down by retail stores 160, 162 and their various store characteristics. The prediction application 120 may select an individual device characteristic of the electronic device 150 and/or may select an individual store characteristic of the retail store 160. The predictive algorithm 122 may determine from historical data the number of instances the electronic device 150 and the retail store 160 have been involved in recorded instances of loss when the selected device characteristic and/or the selected store characteristic have been in effect. The predictive algorithm 122 may be configured by the prediction application 120 to analyze a plurality of combinations of device characteristics and store characteristics fed to it by the prediction application 120. The prediction application 120 in configuring the predictive algorithm 122 may provide combinations of these characteristics that appear to be related to instances of inventory loss. When high correlations are discovered, this may indicate that special security measures should be applied to shipments of the electronic device 150 to the retail store or stores 160, 162 wherein the particular device and/or store characteristics involved in the high correlation findings are present.

The prediction application 120 configures the predictive algorithm 122 for the telecommunications service provider 140, manufacturer, or distributor of electronic devices 150, 152 seeking to reduce inventory loss. The prediction application 120 gathers information about a plurality of device characteristics for electronic devices 150, 152 that may be shipped. The prediction application 120 gathers information about a plurality of store characteristics of retail stores 160, 162 to which the electronic devices 150, 152 may be shipped. The prediction application 120 may cause the device characteristic information and store characteristic information to be stored on behalf of the predictive algorithm 122 in the database 130. The database 130 is associated with the prediction server 110. The prediction application 120 may manage the characteristic information by updating the device characteristics for new characteristics that may be found to be statistically significant or indicative. The new characteristics may be for electronic devices 150, 152 that are newly released or they may be for existing electronic devices 150, 152 wherein the device characteristics are newly discovered to be statistically significant for predicting loss. The prediction application 120 also may manage the characteristic information by updating the store characteristics for new characteristics of retail stores 160, 162 as well as adding newly discovered store characteristics that are found to be significant. The prediction application 120 also may delete device characteristics and store characteristics that are found to be not statistically useful and/or discontinues accumulating this information.

The prediction application 120, in configuring the predictive algorithm 122 and providing the predictive algorithm 122 with data, accesses as broad a range of information about electronic devices 150, 152, retail stores 160, 162, and inventory loss statistics as possible from the database 130 and other sources. The prediction application 120 learns of associations between device characteristics and store characteristics and may perform correlation calculations between additional device characteristics and store characteristics when correlation results indicate that such additional calculations may be useful. The prediction application 120 may search for device characteristics and store characteristics and associations between them, particularly involving instances of loss, where such characteristics and associations may not be overtly visible or apparent. These operations may be useful in building the predictive algorithm 122. Because device characteristics may include aspects of the electronic devices 150, 152 that lie beyond hardware and software features of the electronic devices 150, 152, some device characteristics may be present and significant but difficult to detect. For example, a subtle or overlooked aspect of the shipping arrangement of an electronic device 150 when coupled with instances of short store manager tenure may be discovered to be highly correlated to inventory loss of the electronic device 150 at retail stores 160, 162 with managers of short tenure. Changing the aspect of the shipping arrangement or training the store managers are two possible targeted solutions to the problem. In this example, the aspect of the shipping arrangement may be a device characteristic and the manager tenure is a store characteristic. That these two characteristics, when common to the same shipment of electronic devices 150, 152, would be highly correlated with inventory loss, may not be apparent to even informed observers. The prediction application 120 adds to the database 130 a plurality of information about electronic devices 150, 152 and their device characteristics and retail stores 160, 162 and their store characteristics. In some cases, long store manager tenure also may be a predictor of greater inventory loss. In other cases, the nearing departure of the store manager from a store location, for example on completion of an assignment and/or reassignment to a different store or position, may be a predictor of greater inventory loss.

The prediction application 120 stores previously generated information in the database 130 about correlations discovered between the device and store information and instances of inventory loss. The prediction application 120 continually searches for patterns of economic activity associated with electronic devices 150, 152, for example sales, promotions, advertising, and other non-hardware and non-software characteristics in a similar manner as it searches for non-physical characteristics associated with retail stores 160, 162. The prediction application 120 stores this information for later use in constructing the predictive algorithms 122, 124 or in providing information to the predictive algorithms 122, 124 when they are in operation.

The telecommunications service provider 140, that may operate the prediction server 110 hosting the prediction application 120, may use the prediction application 120 to configure a plurality of predictive algorithms 122, 124. Each predictive algorithm 122, 124 may be structured and used for a different type of shipment of electronic devices 150, 152 to a different group of retail stores 160, 162. Each instance of the predictive algorithm 122, 124 may contain several calculations of correlations of different individual or combinations of device characteristics and store characteristics with instances of inventory loss. A single shipment may comprise a plurality of different types of electronic devices 150, 152 and may be shipped to a plurality of retail stores 160, 162. The predictive algorithm 122 may contain several calculations of correlations because the telecommunications service provider 140 may wish to have several individual or combined device characteristics and store characteristics considered together in the same risk evaluation for a shipment. The predictive algorithm 122 may apply weights or relative loss risk factors to each calculated correlation based on estimates of risk to determine a blended or composite loss risk factor for the entire shipment.

The prediction application 120 configures at least one predictive algorithm 122 and makes data about electronic devices 150, 152 and their destination retail stores 160, 162 available to the predictive algorithm 122. The predictive algorithm 122 calculates at least one correlation between at least one characteristic of the electronic devices 150, 152 and/or the retail stores 160, 162 and instances of loss of the electronic devices 150, 152. The at least one device characteristic and/or store characteristic may be the dependent variable in the correlation calculation. The instances of inventory loss may be the independent variable. As device characteristics, store characteristics, and/or combinations thereof are varied and processed by the predictive algorithm 122, their statistical correlation to inventory loss are calculated and observed. As noted, the predictive algorithm 122 may be built to contain more than one correlation calculation, with each correlation calculation provided a weight, risk factor, or other relative measure, and the weighted correlation calculations totaled or otherwise combined to produce a composite loss risk factor for the entire shipment under consideration.

The predictive algorithm 122 may determine a composite loss risk factor that is determined to be significant, i.e., one or more calculations of correlation reveal that a characteristic of an electronic device 150, a characteristic of a retail store 160, or a combination of the characteristics is significantly correlated to inventory loss of the electronic device 150. When the predictive algorithm 122 generates such a result, the prediction application 120 may then determine a remedial action or control to be applied to the particular electronic device 150 at the particular point of loss. The control may comprise changing an aspect of the shipping process with the logistics provider 170. The control may comprise changing an aspect of a receiving or storage process used by the retail stores 160, 162 for the electronic device 150, adding a step, tightening a requirement, or plugging a "hole" that had been found in the process. The present disclosure teaches a selective or targeted application of remedial action or controls at the identified point of highest risk of loss. It may well be expensive as well as unnecessary to apply a security measure, remedial action, or control for all electronic devices 150, 152 at all retail stores 160, 162. The use of the prediction application 120 to configure at least one predictive algorithm 122 and iteratively change inputs until meaningful correlations are found may allow the targeted approach taught herein. Applying a specific, targeted, and perhaps customized control at an identified point of security weakness or vulnerability may alleviate the problem and be less expensive than a broader, more "shotgunned" solution.

The present disclosure teaches an iterative process of considering a plurality of device characteristics, store characteristics, related processes, and various combinations thereof in correlation calculations with instances of inventory loss. A series of correlation calculations may suggest making changes to a process for handling an electronic device 150 at a group of retail stores 160, 162. After the process change is made, however, inventory losses may continue at an unacceptable rate. The prediction application 120 may change device and/or store characteristics used by the predictive algorithm 122 created for those instances of electronic devices 150, 152 and inventory loss. It may be discovered that a different or additional targeted process change may be necessary to reduce inventory losses of the electronic devices 150, 152 at the group of retail stores 160, 162. The present disclosure teaches the individual and combined consideration of many characteristics in correlation calculations with instances of inventory loss in a plurality of iterations before the causes of loss may be definitively identified and targeted.

Although the prediction application 120 may configure a predictive algorithm 122 that may yield statistically high correlations between instances of inventory loss and some device and/or store characteristics, it still may be necessary to consider additional characteristics or processes as targets for remedial action. Some correlations may be significantly high but may not be useful for practical or business reasons. Even when the device or store characteristic or related process is finally and correctly identified as a driver of the inventory loss, the telecommunications service provider 140, manufacturer, or distributor of electronic devices 150, 152 seeking to reduce inventory loss may perform further analysis to determine more than one remedial action or process to apply to the problem. Adjustments to the remedial action or process may be made before it becomes effective in reducing inventory loss to an acceptable level.

Different levels of monitoring of shipment and store receiving and storage may depend on the severity of expected or predicted loss of electronic devices 150, 152 or accessories and further depend on the nature of the problem suspected to be occurring at the retail stores 160, 162 or elsewhere. The telecommunications service provider 140 may wish to justify the cost of the corrective action in terms of predicted reductions in inventory losses. The telecommunications service provider 140 may find that it is unable to justify the cost of tracking every electronic serial number of every electronic device 150, 152. Remedial action for severe cases of inventory loss may be expensive to apply and therefore may not be applied widely throughout the retail network of the telecommunications service provider 140.

Because electronic devices 150, 152 are provided unique electronic serial numbers that may be tracked, the ultimate destination of lost or stolen electronic devices 150, 152 may be discovered. This information may be useful in detecting causes of inventory loss. If electronic devices 150, 152 with a valuable characteristic that are determined to be lost or stolen are ultimately found in a distant foreign country, this may suggest one type of problem and remedial action. If the electronic devices 150, 152 are instead found to be in the possession of employees of the retail store to which they were shipped and are being used as demonstration models, this may suggest an entirely different type of problem and remedial action. The telecommunications service provider 140 may use a plurality of information systems that allow it to track electronic devices 150, 152 by electronic serial numbers.

The present disclosure teaches the prediction application 120 configuring the predictive algorithms 122, 124 based on the characteristics and factors used as variables in correlation calculations. The telecommunications service provider 140 may apply various controls and then in turn validate its findings with actual raw data about subsequent inventory losses. Internal information systems such as an order management system used by the telecommunications service provider 140 may be used in conjunction with output from a retail management system used by the retail store to track electronic devices 150, 152. This may permit "closing of the loop" in prediction, action and validation. The results may be used to validate predictions made by the predictive algorithm 122. Adjustments to applied controls may be made depending on observed results. The present disclosure promotes predicting where inventory losses will be. The telecommunications service provider 140 then may follow up its predictions with field work and analysis to confirm its findings. Effectiveness and success in implementing the teachings herein may depend on implementing controls in the appropriate places in the appropriate amounts and making adjustments where necessary.

In an embodiment, the telecommunications service provider 140 may observe and audit the actions of the logistics provider 170 and may apply controls where possible to the processes of the logistics provider 170. The telecommunications service provider 140 also may engage the logistics provider 170 to assist in at least one of observing and auditing the actions of retail stores 160, 162 receiving shipments.

The network 180 promotes communication between the components of the system 100. The network 180 may be any communication network including a public data network (PDN), a public switched telephone network (PSTN), a private network, and/or a combination.

Figure 2A:
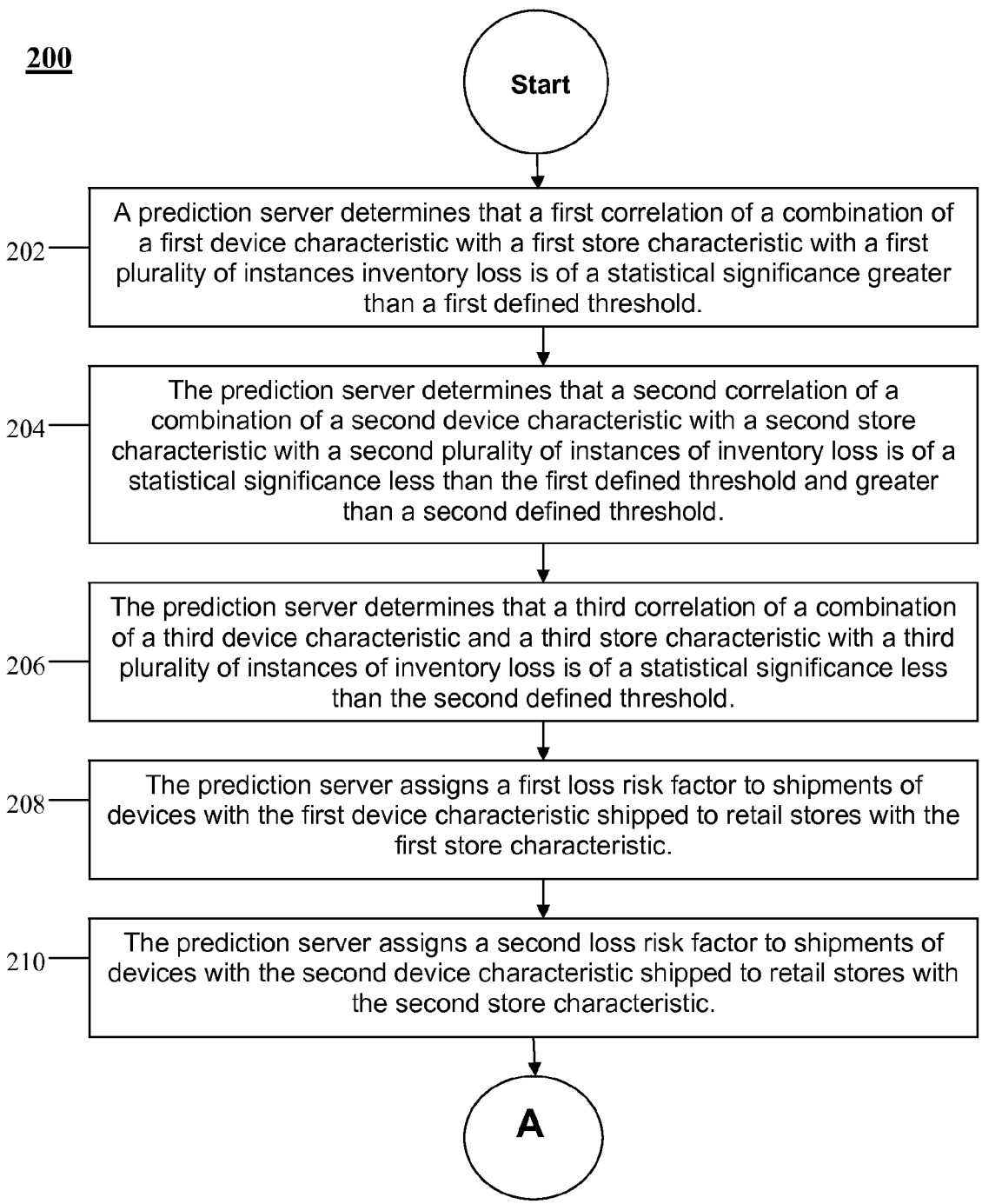
FIG. 2a is a flow chart illustrating a method according to an embodiment of the disclosure.
Figure 2B:
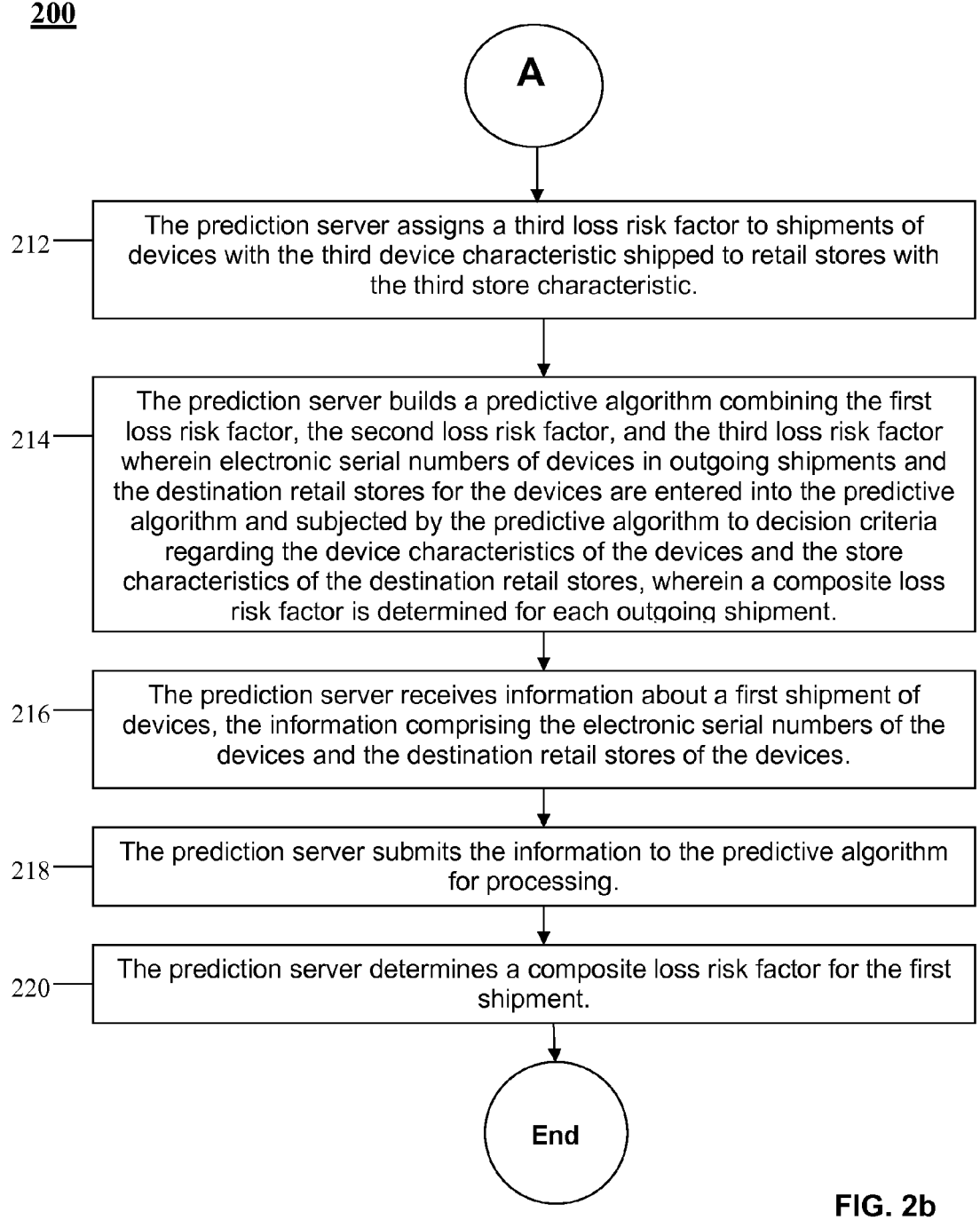
FIG. 2b is a flow chart illustrating a method according to an embodiment of the disclosure.

Turning now to FIG. 2, a processor-implemented method 200 of inventory loss prediction is provided. Beginning at block 202, the prediction server 110 determines that a first correlation of a combination of a first device characteristic with a first store characteristic with a first plurality of instances of inventory loss is of a statistical significance greater than a first defined threshold.

At block 204, the prediction server 110 determines that a second correlation of a combination of a second device characteristic with a second store characteristic with a second plurality of instances of inventory loss is of a statistical significance less than the first defined threshold and greater than a second defined threshold. At block 206, the prediction server 110 determines that a third correlation of a combination of a third device characteristic and a third store characteristic with a third plurality of instances of inventory loss is of a statistical significance less than the second defined threshold.

At block 208, the prediction server 110 assigns a first loss risk factor to shipments of electronic devices 150, 152 with the first device characteristic shipped to retail stores 160, 162 with the first store characteristic. At block 210, the prediction server 110 assigns a second loss risk factor to shipments of electronic devices 150, 152 with the second device characteristic shipped to retail stores 160, 162 with the second store characteristic. At block 212, the prediction server 110 assigns a third loss risk factor to shipments of electronic devices 150, 152 with the third device characteristic shipped to retail stores 160, 162 with the third store characteristic.

At block 214, the prediction server 110 builds the predictive algorithm 122 combining the first loss risk factor, the second loss risk factor, and the third loss risk factor wherein electronic serial numbers of electronic devices 150, 152 in outgoing shipments and the destination retail stores 160, 162 for the electronic devices 150, 152 are entered into the predictive algorithm 122 and subjected by the predictive algorithm 122 to decision criteria regarding the device characteristics of the electronic devices 150, 152 and the store characteristics of the destination retail stores 160, 162, wherein a composite loss risk factor is determined for each outgoing shipment. At block 216, the prediction server 110 receives information about a first shipment of electronic devices 150, 152, the information comprising the electronic serial numbers of the electronic devices 150, 152 and the destination retail stores 160, 162 of the electronic devices 150, 152. At block 218, the prediction server 110 submits the information to the predictive algorithm 122 for processing. At block 220, the prediction server 110 determines a composite loss risk factor for the first shipment.

Figure 3:
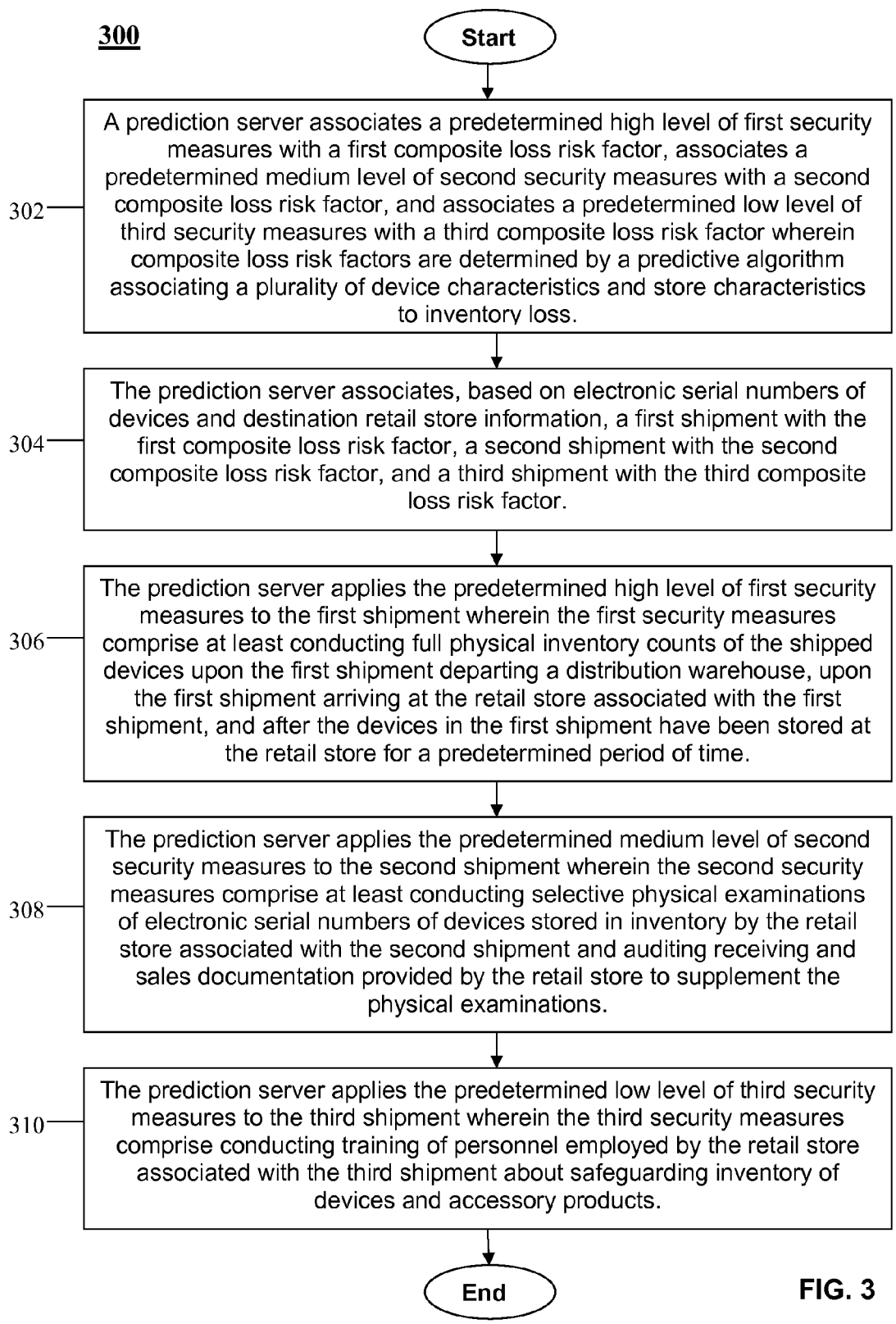
FIG. 3 is a flow chart illustrating a method according to an embodiment of the disclosure.

Turning now to FIG. 3, a processor-implemented method 300 of inventory loss prediction is provided. Beginning at block 302, a prediction server associates a predetermined high level of first security measures with a first composite loss risk factor, associates a predetermined medium level of second security measures with a second composite loss risk factor, and associates a predetermined low level of third security measures with a third composite loss risk factor wherein composite loss risk factors are determined by a predictive algorithm associating a plurality of device characteristics and store characteristics to inventory loss.

At block 304, the prediction server associates, based on electronic serial numbers of devices and destination retail store information, a first shipment with the first composite loss risk factor, a second shipment with the second composite loss risk factor, and a third shipment with the third composite loss risk factor.

At block 306, the prediction server applies the predetermined high level of first security measures to the first shipment wherein the first security measures comprise at least conducting full physical inventory counts of the shipped devices upon the first shipment departing a distribution warehouse, upon the first shipment arriving at the retail store associated with the first shipment, and after the devices in the first shipment have been stored at the retail store for a predetermined period of time.

At block 308, the prediction server applies the predetermined medium level of second security measures to the second shipment wherein the second security measures comprise at least conducting selective physical examinations of electronic serial numbers of devices stored in inventory by the retail store associated with the second shipment and auditing receiving and sales documentation provided by the retail store to supplement the physical examinations.

At block 310, the prediction server applies the predetermined low level of third security measures to the third shipment wherein the third security measures comprise conducting training of personnel employed by the retail store associated with the third shipment about safeguarding inventory of devices and accessory products.

Figure 4:
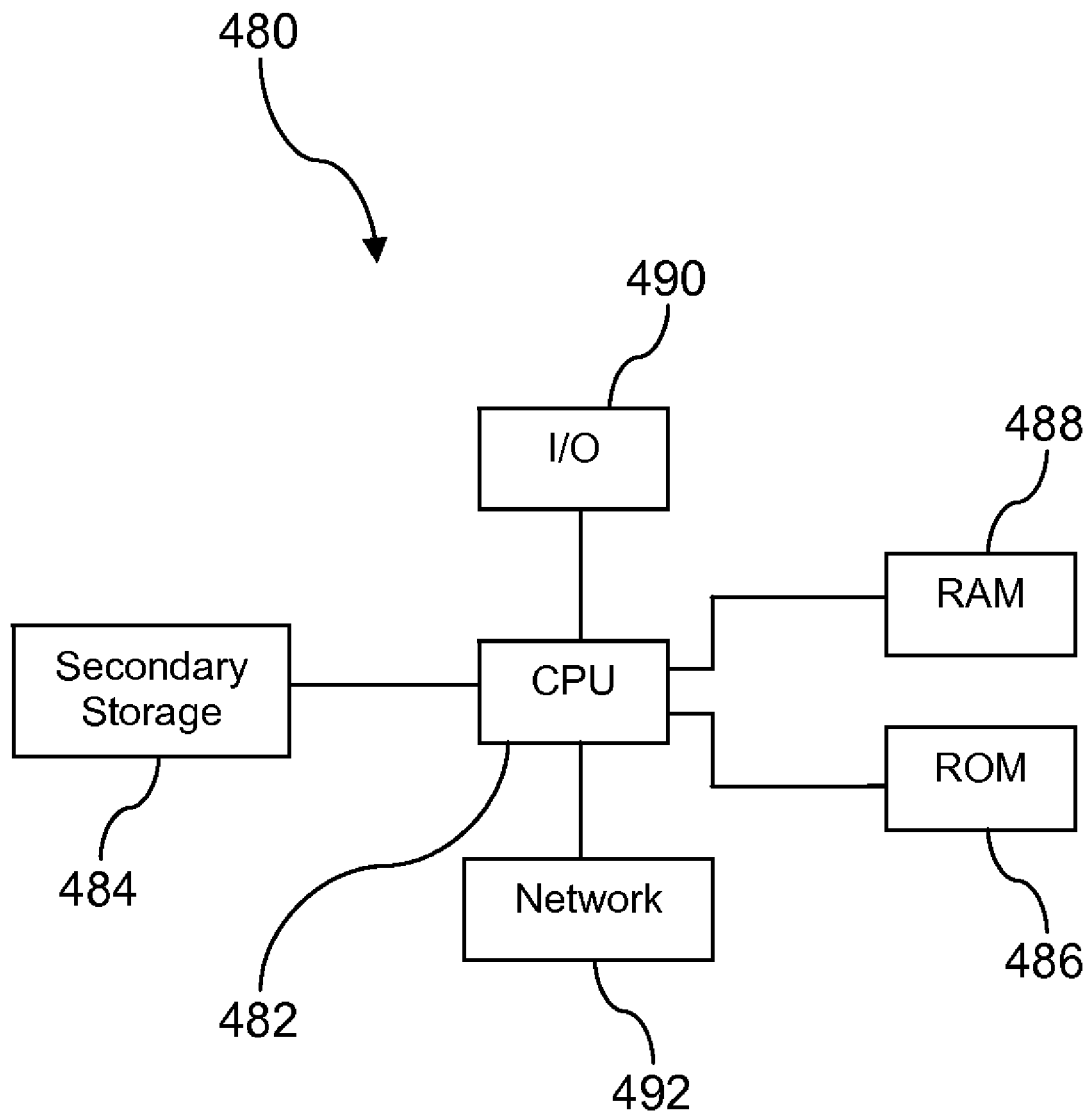
FIG. 4 illustrates an exemplary computer system suitable for implementing some aspects of the several embodiments of the disclosure.

FIG. 4 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as non-transitory storage and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data in part by directly accessing the computer program product, for example by reading from a CD-ROM disk inserted into a disk drive peripheral of the computer system 480. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method of inventory loss prediction, comprising:
    a prediction server determining that a first correlation of a combination of a first device characteristic with a first store characteristic with a first plurality of instances of inventory loss is of a statistical significance greater than a first defined threshold;
    the prediction server determining that a second correlation of a combination of a second device characteristic with a second store characteristic with a second plurality of instances of inventory loss is of a statistical significance less than the first defined threshold and greater than a second defined threshold;
    the prediction server determining that a third correlation of a combination of a third device characteristic and a third store characteristic with a third plurality of instances of inventory loss is of a statistical significance less than the second defined threshold;
    the prediction server assigning a first loss risk factor to shipments of devices with the first device characteristic shipped to retail stores with the first store characteristic;
    the prediction server assigning a second loss risk factor to shipments of devices with the second device characteristic shipped to retail stores with the second store characteristic;
    the prediction server assigning a third loss risk factor to shipments of devices with the third device characteristic shipped to retail stores with the third store characteristic;
    the prediction server building a predictive algorithm combining the first loss risk factor, the second loss risk factor, and the third loss risk factor wherein electronic serial numbers of devices in outgoing shipments and the destination retail stores for the devices are entered into the predictive algorithm and subjected by the predictive algorithm to decision criteria regarding the device characteristics of the devices and the store characteristics of the destination retail stores, wherein a composite loss risk factor is determined for each outgoing shipment;
    the prediction server receiving information about a first shipment of devices, the information comprising the electronic serial numbers of the devices and the destination retail stores of the devices;
    the prediction server submitting the information to the predictive algorithm for processing; and
    the prediction server determining a composite loss risk factor for the first shipment.

2. The method of claim 1, wherein the predictive algorithm subjecting electronic serial numbers of devices in outgoing shipments and the destination retail stores for the devices to decision criteria comprises identifying the device characteristics of the devices and identifying the store characteristics of the destination retail stores for the devices.

3. The method of claim 1, further comprising determining that a fourth correlation of the first device characteristic and the third store characteristic associated with the first plurality of instances of inventory loss is of a statistical significance less than the first defined threshold and greater than the second defined threshold.

4. The method of claim 3, further assigning a fourth loss risk factor to shipments of devices with the first device characteristic shipped to retail stores with the third store characteristic.

5. The method of claim 1, wherein the predictive algorithm determines individual loss risk factors for a plurality of combinations of device characteristics with destination store characteristics for devices in a shipment and wherein the predictive algorithm applies one of weights and other statistical factors to the individual loss risk factors in a shipment to determine the composite risk factor for the shipment.

6. The method of claim 1, wherein the composite risk factor for a shipment is used to determine at least one security measure to apply to the shipment.

7. A processor-implemented method of inventory loss prediction, comprising:
    a prediction server associating a predetermined high level of first security measures with a first composite loss risk factor, associating a predetermined medium level of second security measures with a second composite loss risk factor, and associating a predetermined low level of third security measures with a third composite loss risk factor wherein composite loss risk factors are determined by a predictive algorithm associating a plurality of device characteristics and store characteristics to inventory loss;
    the prediction server associating, based on electronic serial numbers of devices and destination retail store information, a first shipment with the first composite loss risk factor, a second shipment with the second composite loss risk factor, and a third shipment with the third composite loss risk factor;
    the prediction server applying the predetermined high level of first security measures to the first shipment wherein the first security measures comprise at least conducting full physical inventory counts of the shipped devices upon the first shipment departing a distribution warehouse, upon the first shipment arriving at the retail store associated with the first shipment, and after the devices in the first shipment have been stored at the retail store for a predetermined period of time;

the prediction server applying the predetermined medium level of second security measures to the second shipment wherein the second security measures comprise at least conducting selective physical examinations of electronic serial numbers of devices stored in inventory by the retail store associated with the second shipment and auditing receiving and sales documentation provided by the retail store to supplement the physical examinations; and the prediction server applying the predetermined low level of third security measures to the third shipment wherein the third security measures comprise conducting training of personnel employed by the retail store associated with the third shipment about safeguarding inventory of devices and accessory products.

8. The method of claim 7, wherein the predictive algorithm determines a plurality of statistical correlations of combinations of device characteristics with store characteristics with instances of inventory loss and identifies statistically significant correlations for use in analyzing inventory loss and determining composite loss risk factors.

9. The method of claim 7, wherein applying security measures further comprises engaging transportation and logistics providers to assist in at least one of observing and auditing the actions of retail stores receiving shipments.

10. The method of claim 7, further comprising combining selected elements of the first security measures and selected elements of the second security measures and applying the combined selected elements to a fourth shipment.

11. The method of claim 7, further comprising applying the predetermined high level of first security measures when a retail store is scheduled to be closed.

12. The method of claim 7, further comprising applying the predetermined high level of first security measures at least one of when devices in a shipment comprise recently launched products and when devices in a shipment have been subject to an intensive advertising campaign.

* * * * *